No. 892,816. PATENTED JULY 7, 1908.
J. ENGELEN.
ADJUSTABLE DISTRIBUTING VALVE.
APPLICATION FILED NOV. 11, 1907.
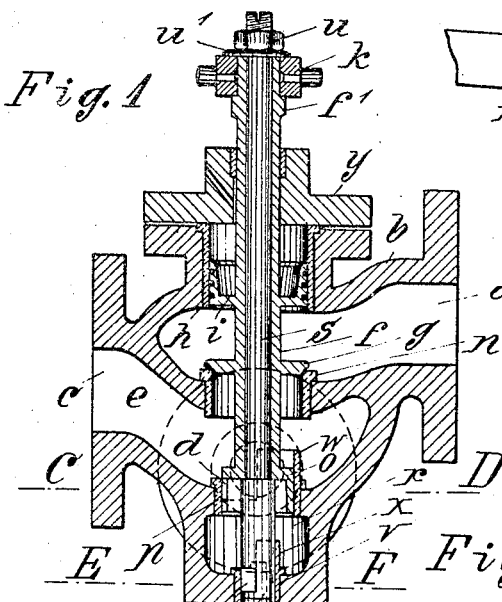
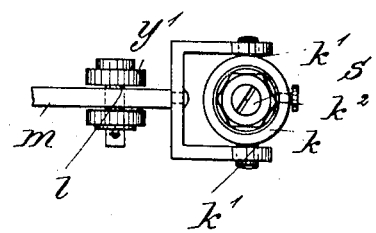
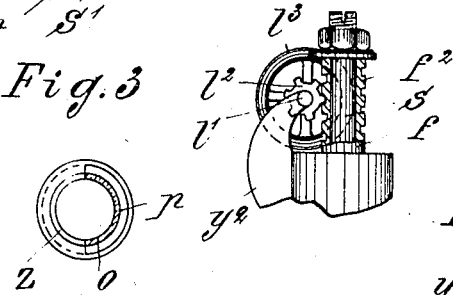
Witnesses:
Inventor:
Josef Engelen.

UNITED STATES PATENT OFFICE.

JOSEF ENGELEN, OF COLOGNE, GERMANY.

ADJUSTABLE DISTRIBUTING-VALVE.

No. 892,816.        Specification of Letters Patent.        Patented July 7, 1908.

Application filed November 11, 1907. Serial No. 401,613.

*To all whom it may concern:*

Be it known that I, JOSEF ENGELEN, a citizen of the Empire of Germany, residing at Cologne-on-the-Rhine, in the Empire of Germany, have invented a new and useful Adjustable Distributing-Valve, of which the following is a specification.

My invention consists of an adjustable valve comprising three valves proper, of which the first one serves as a stop-valve and regulates the quantity of a liquid passing through it, while the second and third valves connected with the first one and partaking in its motion are so disposed, that the second valve permits a part of the liquid passing through the first valve to pass off and that the third valve permits a part of the liquid passing through the second valve to pass off. The connection between the three valves is so arranged, that the quantities of the liquid passing through them shall be in a certain proportion to one another and there are means provided for varying at pleasure the proportion between the quantities of liquid passing through the first and second valves and also the proportion between the quantities of liquid passing through the second and third valves.

I will now proceed to describe my invention with reference to the accompanying drawing, in which—

Figure 1 is a vertical longitudinal section through the adjustable distributing valve on the line A—B in Fig. 2, Fig. 2 is a side view of the same when looked at from right to left in Fig. 1, Fig. 3 is a horizontal section through the second valve proper on the line C—D in Fig. 1, seen from below, its seat being shown in plan, Fig. 4 is a horizontal section through the third valve proper on the line E—F in Fig. 1, seen from below, its seat being shown in plan, Fig. 5 is a plan of the upper part shown at Fig. 2, and Fig. 6 is a modification of the upper part shown at Fig. 2.

Similar letters of reference refer to similar parts throughout the several views.

There are known water purifiers comprising a mixing vessel, a lime vessel and a soda vessel, to which the water to be purified requires to be distributed in a certain proportion, that depends upon the percentage of matters contained in the raw water and producing boiler-scale. Such water purifiers are more or less complicated and the several valves, cocks and the like require a constant attention for adjusting them to the varying consumption of feed water for boiler-feeders or the like and to the varying percentage of the foreign matters suspended in the raw water.

My new adjustable distributing valve to be hereinafter described is useful for simplifying such water purifiers, as not only the supply of raw water can be regulated, but also the proportion, in which the raw water is to be distributed to the mixing, lime and soda vessels, can be adjusted in a most simple manner.

Of course the new adjustable distributing valve may also be found useful for various other purposes.

In the drawing $b$ denotes a valve box divided by two partitions into three spaces, of which the upper one communicates with the tubular connection $a$, the middle one $e$ with the opposite tubular connection $c$, and the lower one $r$ with the lateral tubular connection $q$. In the upper part of the box $b$ a cylindrical bush $h$ is secured, in which a piston $i$ is mounted to vertically reciprocate. Coaxial with the bush $h$ three further bushes $n$, $p$ and $v$ are secured in the two partitions and in the bottom of the box $b$ respectively. The bush $n$ serves as a seat for the first or stop-valve $g$, the bush $p$ forms the seat of the second valve $o$, and the bush $v$ that of the third valve $s^1$. The piston $i$ and the two first valves $g$ and $o$ are made in one piece with a hollow spindle $f$, in which a solid spindle $s$ is mounted to turn while it is prevented from longitudinally shifting by a shoulder below and a washer beneath the nut $u$ above. The hollow spindle $f$ is provided with a collar $f^1$ shaped as a counter-nut, between which and the washer $u^1$ a crosshead $k$ is disposed. The upper end of the internal spindle $s$ is screw-threaded and engages in the nut $u$ already mentioned and is provided in its top with a cross slot (see Figs. 1 and 5), in which a flat tool can engage for turning the spindle $s$. The crosshead $k$ can be turned on the hollow spindle $f$ and fastened thereon by screwing home the nut $u$ or a set-screw $k^2$ may be provided for this purpose. The hollow spindle $f$ passes through a cover $y$, which is cast in one piece with a forked support $y^1$. The latter has fixed in it a horizontal pin $l$, on which a two-armed lever $m$ is mounted to rock. The right arm of this lever $m$ in Figs. 2 and 5 is forked and its two arms have slots in which the two pins $k^1 k^1$ of the crosshead $k$ engage. The left arm of the lever $m$ may be assumed to be pivotally connected in any known manner with a float in the clarifier of the respective water purifier or the like.

The first or stop-valve $g$ is made of the same diameter as the piston $i$ or nearly so, so that the whole of the two spindles $s$ and $f$ and the parts $i$, $g$, $o$ and $s^1$ on them is balanced, when the liquid is admitted to the box $b$ through the connection $a$.

The second valve $o$ consists of a circular disk with a pendent semicylindrical projection, so that a space $z$ is left (see Figs. 1 and 3). The underside of the disk is made to normally flush with the upper face of the seat $p$, if the stop-valve $g$ is closed as shown. The bush $p$ is on half the periphery of its top provided with a semicylindrical lengthening $w$, which can cover the space $z$ of the valve $o$, if the latter is turned through an angle of 180° and is shifted upwards. Then no liquid will be permitted to pass from the middle space $e$ to the lower space $r$, if the stop-valve $g$ is quite opened, so that all the liquid will pass from the upper space through the seat $n$ to the middle space $e$ and thence through the connection $c$. If the valve $o$ occupies its position shown at Fig. 1 and is opened simultaneously with the first valve $g$, the part of the liquid passing from the middle space $e$ through the bush $p$ to the lower space $r$ will be a maximum. If the second valve $o$ is turned with the first valve $g$ through an angle of 90°, only half of the said amount of the liquid will pass from the middle space $e$ to the lower space $r$, since the window $d$ formed by the top edge of the bush $p$, the two vertical edges of the lengthening $w$ and the underside of the disk of the valve $o$ will be reduced to half the size of the space $z$. By turning the two valves $g$ and $o$ through a smaller or larger angle than 90° (by means of a screw-key applied to the hexagonal collar $f^1$) the amount of liquid passing from the middle space $e$ to the lower space $r$ can be regulated. The diameters of the two valves $g$ and $o$ may be so proportioned, that for the position shown in Fig. 1 the quantities of liquid passing simultaneously through the connection $c$ and to the lower space $r$ respectively shall be in a certain proportion, which remains constant, no matter whether both valves $g$ and $o$ are shifted upwards through the whole stroke or through a part only of the same. If both valves $g$ and $o$ are turned through a certain angle, of course the said proportion between the two quantities of liquid will be altered.

The third valve $s^1$ is shown as forming the hollow lower end of the internal spindle $s$, which is provided with a window $t$ that extends over half the periphery. For the normal position shown of the three valves $g$, $o$ and $s^1$ the upper edge of the window $t$ is made to flush with the upper edge of the bush $v$. The latter is on half the periphery of its upper edge provided with a semicylindrical lengthening $x$, which can cover the window $t$, if the valve $s^1$ with the spindle $s$ is turned through an angle of 180°. Then no liquid will be permitted to pass from the lower space $r$ downwards through the valve $s^1$, if the stop-valve $g$ is opened, but all of the said liquid will be obliged to escape through the connection $q$. It will be understood, that in a similar manner as described above with reference to the second valve $o$ the amount of liquid passing through the third valve $s^1$ by means of its window $t$ can be adjusted and the proportion between the quantities of liquid passing through the connection $q$ and the valve $s^1$ can be varied at will, it being only necessary to displace the two valves $o$ and $s^1$ with regard to one another, in other words the two spindles $f$ and $s$, the nut $u$ being loosened, a flat tool inserted in the slot at the top of the internal spindle $s$ and turned, after which the nut $u$ is screwed home.

In case the adjustable distributing valve described is to be employed for a water purifier of the kind mentioned above, the connection $a$ may be connected with the source of raw water, the connection $c$ with the mixing vessel, the connection $q$ with the lime vessel, and the connection below the valve $s^1$ with the soda vessel.

The water to be purified is tested in any known manner and the percentage of the matters contained in the water, which may form boiler-scale, is ascertained. Then in accordance with the results and with the aid of some table drawn up the hollow spindle $f$ is turned through a certain angle to adjust the proportion between the quantities of raw water which are permitted to pass through the connection $c$ and the second valve $o$, after which the set-screw $k^2$ is screwed home, so as to render the said proportion constant. At last the nut $u$ is unscrewed and the internal spindle $s$ is turned through a certain angle and then secured by screwing home the nut $u$. Thereby the proportion between the quantities of raw water passing through the connection $q$ to the lime vessel and through the connection beneath the valve $s^1$ to the soda vessel is determined. Then the float in the clarifier is permitted to automatically adjust the stop-valve $g$ in accordance with the quantity of feed water consumed.

It is obvious, that, if the percentage of matters in the raw water forming boiler-scale varies, it is very simple to readjust the three valves $g$, $o$ and $s^1$ with regard to one another, so that the same distributing valve can be used for all percentages of the foreign matters.

In case there is no float, or if the liquid to be distributed is under pressure, the two-armed lever $m$ is omitted, and a pinion $l^2$ fastened on a spindle $l^1$ and engaging in corresponding annular grooves $f^2$ (see Fig. 6) of the hollow spindle $f$ may be employed for adjusting the stop-valve $g$ by means of a hand-wheel $l^3$, the spindle $l^4$ being mounted in a suitable support $y^2$ to turn. Or the hollow spindle $f$ may be longitudinally moved in any other known manner.

The adjustable distributing valve may be varied in many respects without departing from the spirit of my invention.

I claim:

1. In an adjustable distributing valve, the combination with a box having three connections on the sides and a connection at the bottom, it being divided by two partitions into three spaces leading to the lateral connections, of three valves in the same center line in the two partitions and the bottom of said box, means for adjusting the proportion between the quantities of liquid passing through the first and second valves, and means for adjusting the proportion between the quantities of liquid passing through the second and third valves.

2. In an adjustable distributing valve, the combination with a box having three connections on the sides and a connection at the bottom, it being divided by an upper and a lower partition into three spaces leading to the lateral connections, of three seats in the same center line in the two partitions and the bottom of said box, a stop-valve in the upper space for the seat in the upper partition, the two other of said three seats having each a semicylindrical upward extension, a second valve consisting of a circular disk with a pendent semicylindrical projection and mounted in the seat in the lower partition to reciprocate, a hollow spindle connecting said stop-valve with said second valve, so that both valves simultaneously close and open, means for longitudinally adjusting said hollow spindle to adjust the quantity of liquid passing through the stop-valve, a third valve for the seat in the bottom and similar in construction to said second valve, an inner spindle turnable in said hollow spindle and connected with said third valve, means for turning said hollow spindle to adjust the ratio of the quantities of liquid passing through the stop-valve and the second valve, and means for displacing said hollow spindle and said inner spindle with regard to one another to adjust the ratio of the quantities of liquid passing through the second and third valves.

3. In an adjustable distributing valve, the combination with a box having three connections on the sides and a connection at the bottom, it being divided by an upper and a lower partition into three spaces leading to the lateral connections, of a balancing piston mounted in the top of said box to vertically reciprocate, three seats coaxial with said balancing piston in the two partitions and the bottom of said box, a stop-valve in the upper space for the seat in the upper partition, the two other of said three seats having each a semicylindrical upward extension, a second valve consisting of a circular disk with a pendent semicylindrical projection and mounted in the seat in the lower partition to reciprocate, a hollow spindle connecting said balancing piston with said stop-valve and said second valve, so that both valves simultaneously close and open, means for longitudinally adjusting said hollow spindle to adjust the quantity of liquid passing through the stop-valve, a third valve for the seat in the bottom and similar in construction to said second valve, an inner spindle turnable in said hollow spindle and connected with said third valve, means for turning said hollow spindle to adjust the ratio of the quantities of liquid passing through the stop-valve and the second valve, and means for displacing said hollow spindle and said inner spindle with regard to one another to adjust the ratio of the quantities of liquid passing through the second and third valves.

JOSEF ENGELEN.

Witnesses:
 LOUIS VANDORN,
 M. KNEPPERS.